2 Sheets—Sheet 1.

J. F. POTTER.
Farm-Gate.

No. 226,102. Patented Mar. 30, 1880.

Witnesses:
P. C. Dietrich
Floyd Norris

Inventor:
John F. Potter
by his Att'ys
Johnson & Johnson

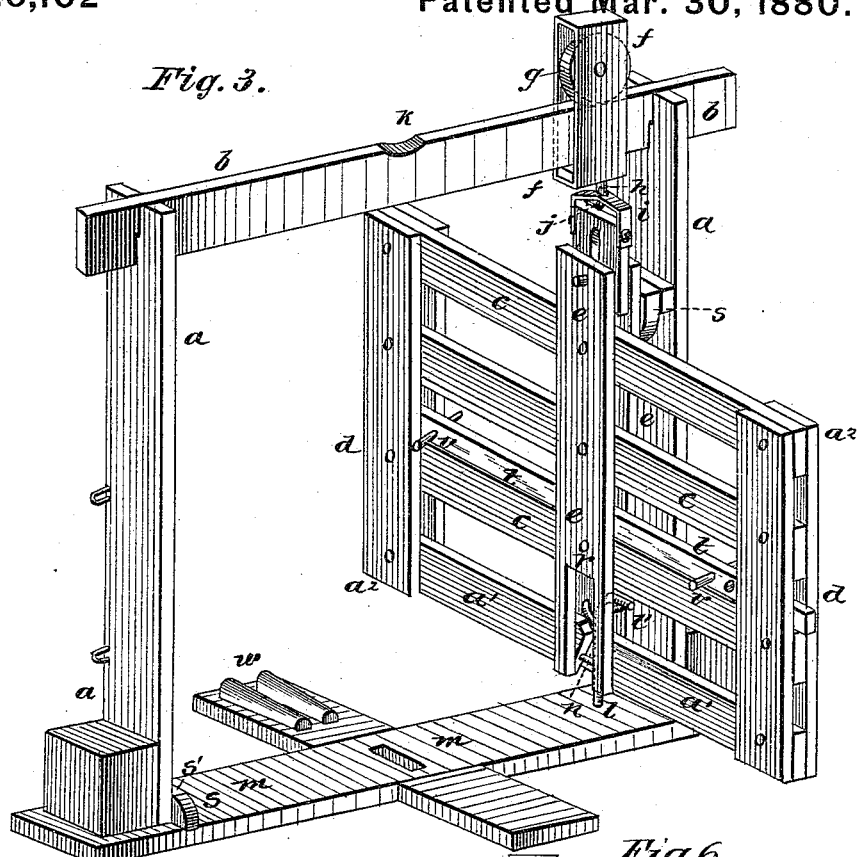

ABSOLUTE
UNITED STATES PATENT OFFICE.

JOHN F. POTTER, OF BELLEFONTE, PENNSYLVANIA.

FARM-GATE.

SPECIFICATION forming part of Letters Patent No. 226,102, dated March 30, 1880.

Application filed January 26, 1880.

*To all whom it may concern:*

Be it known that I, JOHN FERGUS POTTER, of Bellefonte, in the county of Centre and State of Pennsylvania, have invented certain new and useful Improvements in Farm-Gates, of which the following is a specification.

My invention relates to improvements in farm-gates adapted to be swung open and closed upon a central point of suspension, and in which, when swung open at right angles to the line of the fence, it may be moved in such position in direct line with the fence out of the way.

The objects of my improvements are to provide such a gate with means by which it is maintained in central position to be swung open and closed, and at the same time allow the maintaining device to be withdrawn independently of the action of the gate to allow the gate to be moved out of the way to either post for the passage of wagons loaded with hay; and in connection with such independently-adjustable maintaining device I provide means whereby the gate is latched and unlatched with the posts by an endwise-tilting movement of the gate upon such adjustable maintaining device and the point of suspension.

The suspending device consists of a metal strap, which, embracing an edgewise-placed top beam of the posts, sustains the gate by a swiveling connection with its middle vertical bars and a roller upon the top edge of such beam. The latter, having a concave depression, serves to maintain such roller in central position in swinging the gate to open and to close it. My object is to construct a centrally-swinging balanced gate adapted for general use, while rendering it substantial, convenient, and of simple construction, and I attain these objects by the gate shown in the accompanying drawings, in which—

Figure 1:
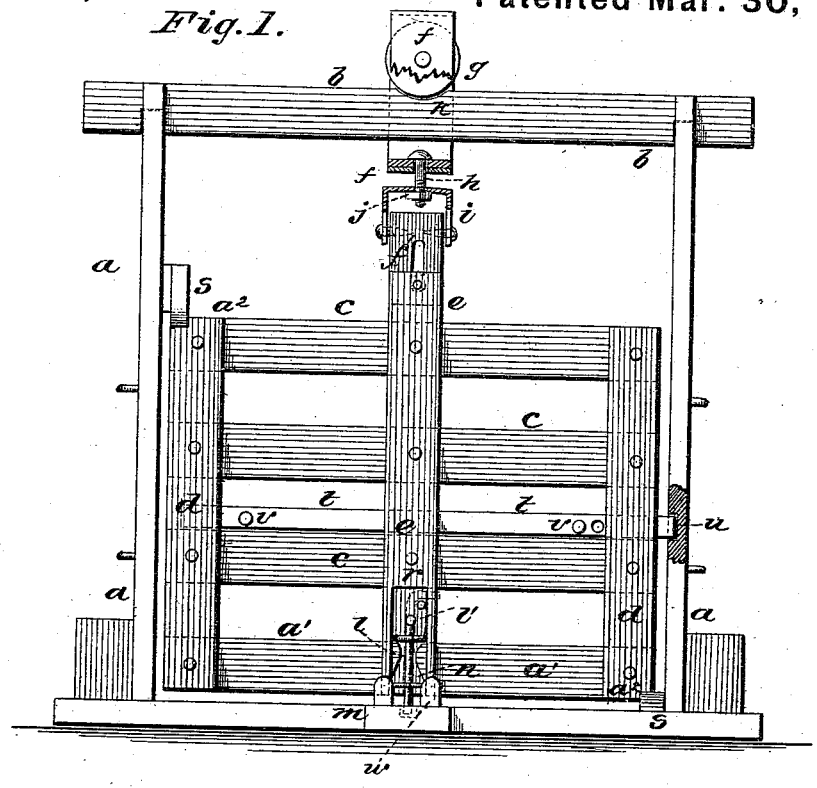
Figure 2:
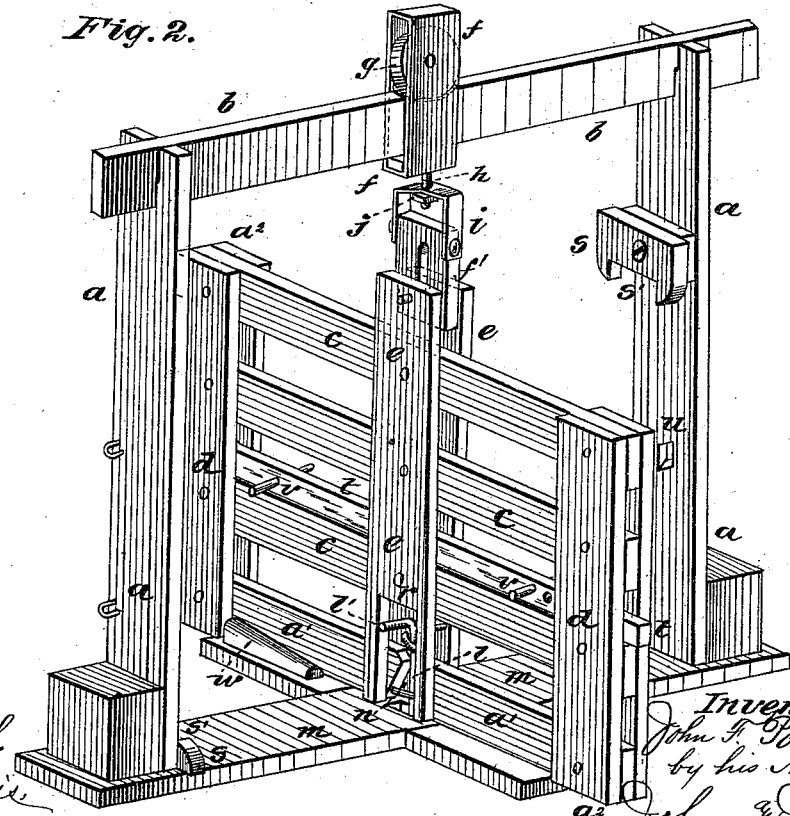

Figure 1 represents an elevation of the gate as closed; Fig. 2, a view, in perspective, of the gate as opened upon its central point of suspension; Fig. 3, a similar view of the gate as moved back upon its suspension-support to one of the posts to open the way for the passage of wagons loaded with hay; Fig. 4, detailed sectional views, showing the adjustable maintaining device or lower pivot-bolt; Fig. 5, the notched latch-block of the post by which the gate is secured when closed, and Fig. 6 the suspension-strap swiveled direct to the gate-bars.

Similar letters refer to the same parts in the several figures.

The posts $a$ $a$ are sunk in the ground about fourteen feet apart, or any intermediate distance, leaving about twelve feet standing above the ground, and firmly connected at their upper ends by a fence-bar, $b$, about six inches wide and one and a half inch thick, and let into the posts its width edgewise.

The gate is constructed of horizontal bars $c$, united by vertical end bars, $d$ $d$, and vertical middle bars, $e$ $e$, one on each side of the gate, and fastened by clinch-nails, the middle bars being of greater width than the end bars.

The gate is suspended from and carried upon the edgewise-placed beam by means of a metal strap, $f$, which, embracing said beam, is connected with the upper ends of the middle bars, $e$ $e$, by a swivel-connection of any suitable construction, such connection being made direct with said bars, or by means of a pivoted link and bail.

The strap $f$ is of wrought-iron bent to form an oblong, and lapped and welded at its top with a roller, $g$, about six inches in diameter, fitted within said strap near its top, and resting upon the top edge of the cross-beam, while a swiveling bolt, $h$, passing through the lower end of this strap, passes also through a bail or strap, $i$, pivoted to the upper end of a link, $f'$, pivoted to the upper ends of the middle bars. The oblong strap is long enough to receive the roller above the cross-beam, and to allow it to be freely moved upon and over the cross-beam in moving the gate to either post when it is turned in position at right angles to the line of the fence to clear the roadway of the gate.

The roller forms the point of suspension for the gate, and travels upon the top edge of the cross-beam when moving the gate, as stated.

In swinging the gate upon its suspension-strap to open and to close it, it is maintained in central position by a concave depression, $k$, in the top edge of the cross-beam, into which the roller fits, and by a vertical pivot-bolt, $l$, secured centrally in the middle of the lower horizontal bar, $a'$, of the gate, and adapted to be bolted into a socketed block, $m$, or stone in the ground. This lower pivot device is adapted for vertical movement independent of the opening and closing movements of the gate and for lateral tilting movement with the gate.

The bolt is placed in a vertical mortise, $n$, in the lower gate-bar, $a'$, of such form as to accommodate a slight lengthwise-tilting movement of the gate in freeing it from the latch-fastenings to open and to close it, and this gives the adaptation for lateral or tilting movement of the upper end of the bolt automatically, and while the bolt is serving its pivot function.

The upper end of the bolt terminates in a handle, $l'$, which projects through a slot, $r$, in one side of the gate-post $e$, and this bolt is only unbolted after the gate is swung open in the line of the road when it is desired to move the gate back to the post. Such pivot-bolt, however, sustains no part of the weight of the gate, but merely serves to hold the gate in central position and give it steadiness in being opened and closed. In whatever position of the gate, it is balanced upon its point of suspension and held at its top by the oblong strap embracing the edgewise-placed cross-beam.

The end bars of the gate serve to arrest it, when closed, by riding over the curved ends of latch-blocks $s$ and dropping into notches $s'$ therein. These latch-blocks are secured to the inner sides of the posts, one having its notch upward and the other its notch downward, so that the lower end of one of the posts will ride over the curved end of one block and fall into its notch, and the top of the other post will pass under the other block and into its notch, and thus fasten the gate at both ends. This latching, however, may be effected by the projecting ends of the lower bar, $a'$. In this latching and unlatching of the gate it must be tilted slightly endwise, or in the direction of its length, and it is for this purpose that the pivot-bolt has capacity for automatic tilting movement, or a slight moving at its top in the line of the gate within the slot $n$, while the lower end of the bolt is held in its socket. Only one latch-block, however, may be used on one of the posts.

In addition to such fastening I may use a slide-bar, $t$, placed between two of the bars of the gate and extending its whole length, and locking with a mortise, $u$, in one of the posts, said slide-bar being provided with hand-holds $v\ v$ at each end and on each side, by which it may be fastened and unfastened; but the latch-blocks, while serving to stop the gate in being swung in closed position, will also form sufficient fastenings for the gate.

The gate is tilted, as described, to latch and unlatch it; but it immediately assumes a balanced position in being swung free of the latch-blocks, or in being latched into the notches.

The gate is held in position, when swung open in the line of the road, by means of a grooved sill-piece, $w$, sunk in the ground a short distance from the pivot-bolt, with the groove in line with the middle of the road, and adapted to receive the lower edge of the lower gate-bar by tilting the gate to place it within the groove, the side-play of the bolt within the gate-slots and the yielding action of the gate upon its swiveling point of suspension giving freedom for such tilting action of the gate.

The grooved sill-piece must be placed above the surface of the ground sufficient to allow the gate-bar to drop into and be held by said groove; but this fastening of the gate in open position is only necessary to prevent the gate being closed by the wind or otherwise in the passage of vehicles.

The gate can be unlatched and swung open from either end and from either side, and when so opened it can be moved along the top cross-beam to either post, as may be most convenient, as the suspension-strap can be freely moved toward either end of the beam from the middle holding-cavity, and it requires little effort to move the gate away from its central position, or to tilt it upon its pivot-bolt, either to latch or to unlatch it, or to place it in or to remove it from the holding-sill groove.

The gate, when swung open, as shown in Fig. 2, allows the passage of vehicles from either side of the road and from either way, and the grooved sill $w$ may be placed on either side of the gate.

I claim—

1. The combination, in a centrally-swinging farm-gate, of the oblong loop suspending-strap $f$, having the roller $g$ at one end and a swiveling bolt, $h$, at the other end, connecting said strap with the gate, with the top cross-beam, $b$, said loop-strap embracing said beam, and the bolt $h$ forming the swiveling bearing upon which the gate is turned, substantially as herein set forth.

2. In a centrally-swinging gate, the combination of the suspending loop-strap $f$, provided with the roller $g$ and the swiveling bolt $h$, connecting said loop-strap with the gate, substantially as herein set forth, with a vertically-adjustable pivot-bolt, $l$, substantially as and for the purpose herein set forth.

3. The combination, in a centrally-swinging farm-gate, of the suspending loop-strap $f$, provided with the roller $g$ and the swiveling bolt $h$, connecting said loop-strap with the gate, substantially as described, with the pivot-bolt $l$, the beveled ends of the bottom gate-bar forming a spreading mortise, n, within which said bolt is confined, and the post latch-blocks s, substantially as and for the purpose herein set forth.

4. The combination, in a centrally-swinging farm-gate, of the suspending loop-strap f, provided with the roller g and the swiveling bolt h, connecting said loop-strap with the gate, substantially as described, with the pivot-bolt l, the beveled ends of the bottom gate-bar forming a spreading mortise, n, within which said bolt is confined, and the ground-sill w, substantially as and for the purpose herein set forth.

In testimony whereof I have hereunto set my hand in the presence of two subscribing witnesses.

JOHN FERGUS POTTER.

Witnesses:
W. B. THOMAS,
D. A. KENNEDY.